June 21, 1938.　　　F. E. BLOUNT　　　2,120,972
CONVERTING SYSTEM
Filed Sept. 11, 1935

INVENTOR
F. E. BLOUNT
BY E. V. Griggs
ATTORNEY

Patented June 21, 1938

2,120,972

UNITED STATES PATENT OFFICE 2,120,972

CONVERTING SYSTEM

Frank E. Blount, Verona, N. J., assignor to Bell Telephone Laboratories, Incorporated, New York, N. Y., a corporation of New York Application September 11, 1935, Serial No. 40,087

8 Claims. (Cl. 175—363)

This invention relates to converting systems and more particularly to a system for converting direct current into alternating current.

An object of this invention is to convert direct current into alternating current efficiently and economically.

A more particular object of this invention is to produce from a direct current an alternating current, the frequency of which is independent of load conditions of a system.

Many systems have been proposed for the conversion of direct current into alternating current. Some of these systems involve the use of moving mechanical parts, while others employ vapor valves or gaseous space discharge devices. The frequency of the alternating current produced by most systems of this latter type is dependent upon the load condition. Since the load characteristic varies over a period of time, the frequency of the alternating current produced by these systems also changes. In telephone communication systems the production from a direct current source of an alternating current, the frequency of which is substantially constant, is desirable for ringing purposes.

In accordance with a feature of this invention, an alternating current which is of substantially constant frequency and independent of load conditions is derived from a direct current. The direct current is converted into an alternating current by the periodic discharges of a condenser which cause the alternate ionization of two gaseous space discharge devices.

In accordance with another feature of this invention, a circuit is controlled by the periodic discharge of a condenser through a relay. The circuit may be closed or opened at different predetermined periods.

In a specific embodiment, the direct current is converted into an alternating current by the periodic discharge of a condenser through a gaseous valve. The electromotive force resulting from the discharge is impressed on the control electrodes of two gaseous space discharge devices. Only one of the devices is in a condition to ionize. The current resulting from the ionization of the device comprises one pulse or half cycle of the alternating current. After the passage of a predetermined interval the condenser again discharges through the gaseous valve and the other device is ionized. The ionization of the second device causes the interruption of the current traversing the device previously ionized. The repetition of this cycle of operation including the periodic ionization of the two devices results in the production of an alternating current.

A more comprehensive understanding of this invention may be obtained by reference to the accompanying drawing in which.

Figure 1:
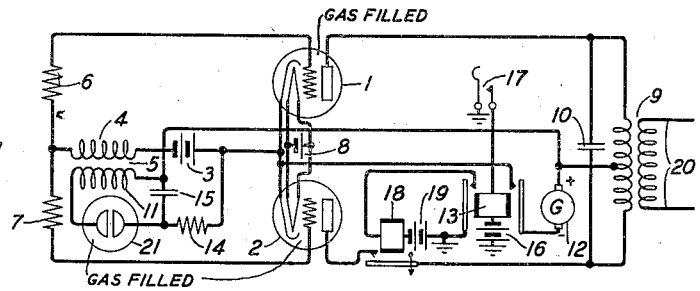
Fig. 1 is a schematic diagram of a simple embodiment of this invention involving the use of gaseous space discharge devices of the hot cathode type.

In Fig. 1, two space discharge devices 1 and 2 are connected in push-pull relation. The devices 1 and 2 are filled with a gaseous medium such as neon, comprise three electrodes, anode, cathode and control electrodes, and are of the type known in the art as heated cathode gaseous space discharge devices. The grids of devices 1 and 2 are normally negatively biased by means of a source 3 to prevent breakdown of these devices. The source 3 is connected to the control electrodes of devices 1 and 2 through the secondary winding 4 of a transformer 5 and through resistances 6 and 7, respectively. Heating current for the cathodes of devices 1 and 2 is supplied by a source 8.

One terminal of the primary winding of a transformer 9 is connected to the anode of space discharge device 1, while the other terminal of the primary winding of transformer 9 is connected to the anode of device 2 through the armature and make contact of a relay 18. The secondary winding of the transformer 9 is connected to the output circuit 20. A condenser 10 is bridged across the terminals of the primary winding of transformer 9. The mid-point of the primary winding of transformer 9 is connected to one terminal of the primary winding 11 of the transformer 5. The positive terminal of a direct current generator 12 is also connected to the mid-point of the primary winding of the transformer 9. The negative terminal of the direct current generator 12 is associated with the other terminal of the primary winding 11 through a series connection including an armature and make contact of a relay 13, a resistance 14 and a two-element gaseous space discharge device 21. The device 21 is a gas-filled ionic discharge device which does not conduct current until a certain critical potential is attained. The gas ionizes at this critical potential and the potential across the electrodes of the device drops to approximately the restoral value of the device. The restoral value is substantially independent of the current flowing through the device. When a condenser is discharged through the device 21 and the inductance comprising the winding 11, the inertia due to the inductance reduces the potential across the device to a value below that required for ionization and the device ceases to conduct current. The negative terminal of the generator 12 is also connected to the cathodes of devices 1 and 2 through an armature and make contact of relay 13. A condenser 15 is connected between the mid-point of the primary winding of transformer 9 and the common connecting point of resistance 14 and device 21. Energizing current is supplied for the relay 13 by a source 16 through a manually operated switch 17. When the armature and make contact of relay 13 engage to connect the cathodes of devices 1 and 2 to the negative terminal of generator 12, anode potential for device 1 is supplied by the direct current generator 12 through a portion of the primary winding of transformer 9, while anode potential is supplied to the device 2 from the generator 12 through a portion of the primary winding of transformer 9 and the armature and make contact of the relay 18. The armature of relay 18 is of the type which is slow in engaging with its associated make contact. A battery 19 furnishes energizing current for the relay 18 through an armature and make contact of relay 13.

The system shown in Fig. 1 is started by closing manually the switch 17. The closing of switch 17 completes a circuit from ground through switch 17 to relay 13 and battery 16 to ground resulting in the energization of relay 13. The energization of relay 13 causes the engagement of the armatures and make contacts of that relay to complete circuits for the energization of relay 18 and to charge condenser 15 through resistance 14. The engagement of the armature and make contact of the relay 13 to charge condenser 15 also results in the supply of anode potential from the generator 12 to the device 1. The bias furnished by the source 3 is, however, of such value that the device 1 does not operate at the potential applied to the anode cathode circuit by the generator 12. The secondary winding 4 of the transformer 5 is wound and is connected in the input circuit of devices 1 and 2 in such a direction that the high voltage surge generated in the primary winding 11 opposes the potential impressed by the source 3. The condenser 15 charges through the resistance 14 with current supplied by generator 12. When the potential across the condenser 15 attains a value equal to that of the operating potential of device 21, the device 21 ionizes to permit condenser 15 to discharge. When this discharge occurs a voltage of short duration is generated in the primary winding 11 of transformer 5. The frequency of these pulses is controlled by the values of the resistance 14 and of the capacity of condenser 15. The surge generated in the winding 4 is sufficient to overcome the negative bias furnished by source 3 to operate the device 1. Current flowing in the anode-cathode circuit of device 1 reduces the potential of the anode and of the plate of the condenser 10 connected to it to a point equal to the internal drop in the device 1. Relay 18 which is slow in operating is actuated at this time and closes the anode circuit of device 2. The potential at the anode of device 2 and the plate of the condenser 10 connected to it is that of the input electromotive force or that generated by the generator 12. The next surge resulting from the discharge through device 21 causes device 2 to operate. The potential at the anode of device 2 quickly falls to a value corresponding to the internal drop of device 2. The plate of the condenser 10 connected to the anode of device 2 assumes the same potential. With the operation of the device 2, the charge drawn from the condenser causes the potential of the opposite plate which is connected to the anode of device 1 to be reduced below the restoral value for device 1 and device 1 ceases to operate. The potential of the anode of device 1 gradually increases to the value of the input voltage as the condenser 10 recharges. When the next pulse is impressed on the control electrode of devices 1 and 2, device 1 is ionized, while device 2 ceases to operate. The impulse of current resulting from the alternate ionization of devices 1 and 2 with the resulting passage of current through the primary of transformer 9, induces an alternating voltage in the secondary thereof and alternating current flows in the output circuit 20. After the production of the first cycle of alternating current and as long as the switch 17 remains closed, the relays 13 and 18 function no further in the operation of the system other than they are continually energized to insure connection of the source 12 to the anode-cathode circuits of devices 1 and 2.

Figure 2:
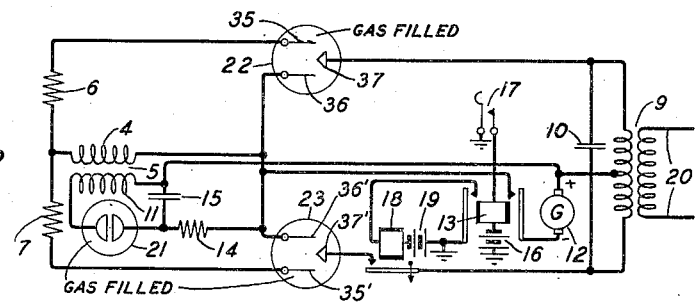
Fig. 2 shows schematically an embodiment of this invention in which cold-cathode space discharge devices are employed.

Fig. 2 shows an inverter circuit similar to that of Fig. 1 except that gaseous space discharge devices known commercially as the cold cathode type are employed instead of the hot cathode type shown in Fig. 1. Two devices 22 and 23 known commercially as the cold cathode three-element type of gaseous discharge devices are connected in push-pull relation in a manner similar to that of the devices 1 and 2, respectively, shown in Fig. 1. The device 22 comprises two cathodes 35 and 36 and an anode 37, and the device 23 comprises two cathodes 35' and 36' and an anode 37'. The cathodes 36 and 36' are connected by the armature and make contact of relay 13 to the negative terminal of the generator 12 in a manner similar to the connection of the cathodes of devices 1 and 2 shown in Fig. 1. The cathodes 35 and 35' are serially connected through resistances 6 and 7 respectively to a terminal of the secondary winding of the transformer 4. The parts of the system, the operation and function of which are the same as those shown in Fig. 1, have the same numerals in Fig. 2. Since no means for heating the cathodes of the devices 22 and 23 is necessary, the source 8 is eliminated from the system shown in Fig. 2. In all other respects the system shown in Fig. 2 is the same as that shown in Fig. 1 except that a source of biasing potential, such as the battery 3 in Fig. 1, has been omitted. Such a source may or may not be employed depending upon the ionization potential of the devices 22 and 23 and the magnitude of the potentials induced in the secondary winding of the transformer 5.

Operation of the system shown in Fig. 2 is started by closing switch 17 which connects the positive terminal of the generator 12 to the anode circuit of device 22 and the circuit comprising resistance 14 and capacitance 15. However, no current flows in the anode circuit of device 22 until the gas is ionized by the potential impressed across the two cathodes 35 and 36 of that device. When the potential across condenser 15 is sufficient to ionize device 21, a surge of current passes through the primary winding 11 of transformer 5. The electromotive force induced in the secondary winding 4 ionizes the gas in the device 22 to permit current to flow from the anode to the cathodes. Current flowing in the anode-cathode circuit of device 22 and to the plate of the condenser 10 connected to the anode 37 is reduced in potential to a point equal to the internal drop of the device 22. Relay 18 operates at this time to close the anode circuit of device 23. The surge resulting from impulse of current through device 21 and the consequent electromotive force induced in the secondary winding 4 causes the gas in device 23 to ionize by the potential impressed across the cathodes 35' and 36' and to permit current to flow in its anode circuit. The current flowing in the anode cathode circuit of device 23 reduces the potential of the plate of the condenser 10 connected to the anode 37' of device 23. When this reduction of potential occurs, the potential of the opposite plate which is connected to the anode 37 of device 22 is reduced below the restoral value for the device 22 and the device 22 ceases to operate. The potential of the anode of device 22 gradually increases to a value of the input voltage as the condenser 10 recharges. When the next pulse is impressed on the input circuit of devices 22 and 23 as a result of the discharge through the device 21, device 22 is ionized and the discharge through device 23 is extinguished. An alternating electromotive force is thereby generated in the output circuit 20.

Figure 3:
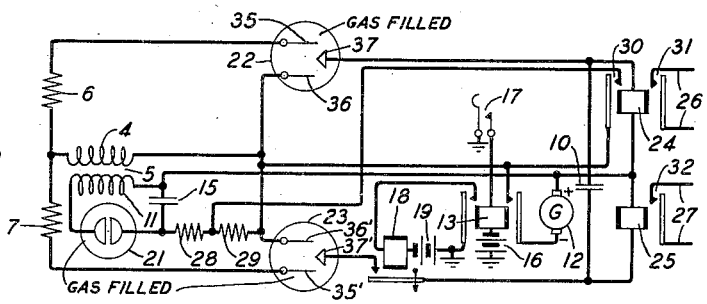
Fig. 3 illustrates an interrupter circuit in accordance with this invention.

In Fig. 3 an interrupter circuit is shown. The circuit illustrated in Fig. 3 is the same as that shown in Fig. 2 except that instead of a transformer 9 connected in the output circuit of devices 22 and 23, a relay 24 is connected in the output of device 22 and a relay 25 in the output of device 23. In addition, the circuit shown in Fig. 3 differs from that shown in Fig. 2 in that instead of resistance 14, two resistances 28 and 29 in series are employed through which the condenser 15 is charged. An armature and its associated make contact 30 of the relay 24 are bridged across the resistance 29 so that the engagement of this armature and make contact results in substantially removing the resistance 29 from the system. When the relay 24 is energized to engage the armature and make contact 30, the condenser 15 is charged substantially through the resistance 28, the resistance of the line associated with armature and make contact 30 being negligible. Since the time interval between the operation of the device 21 is determined by the values of condenser 15 and resistance 28 or resistances 28 and 29, the energization of relay 24 causes a difference in the interval elapsing after the last discharge of the device 21. This feature of the interrupter circuit is of advantage in that interruption of two different periods may be obtained.

The desired interruption is obtained by the engagement and disengagement of the armature and make contact associated with relays 24 and 25. In addition to the armature and make contact 30, another armature and make contact 31 of relay 24 is associated with a circuit 26 while an armature and make contact associated with relay 25, closes and opens a circuit 27. The parts of the system, the operation and function of which are the same as those shown in Fig. 2 have the same numerals in Fig. 3.

The operation of the system shown in Fig. 3 is substantially the same in principle as that shown in Fig. 2. After the switch 17 is operated manually, the condenser 15 commences to charge through resistances 28 and 29. When the potential of the condenser 15 attains a value sufficient to break down the device 21, the resulting discharge current impulse through device 21 operates to induce a surge through secondary winding 4 of transformer 5. Device 22 is ionized as a result of this surge to energize relay 24. The engagement of the armatures and make contacts 31 and 30 closes the circuit 26 and effectively removes the resistance 29 from the system, respectively. At this time the armature and make contact of relay 18 engage to connect the direct current source 12 to the anode cathode circuit of device 23. Immediately after discharge of the condenser 15 through the device 21, the condenser 15 commences to charge through resistance 28. Since the resistance 29 is effectively removed from the charging circuit, the time between the commencement of charge of the condenser and the discharge thereof is determined by the values of resistance 28 and condenser 15. When the potential of the condenser 15 attains that of the breakdown of device 21, a surge is induced in the winding 4. The device 23 is ionized and current flows in the output of device 23 to energize relay 25. The resulting engagement of armature and make contact 32 closes the circuit 27. For the reasons stated in the description of Fig. 1, current through device 22 is extinguished. Relay 24 is as a result deenergized. The armatures and make contacts 30 and 31 are disengaged, the former to effectively restore the resistance 29 to the charging circuit, while the latter effects the breaking of the circuit 26. Condenser 15 is now charged from the direct current source 12 through resistances 28 and 29. After a period elapses, depending upon the time constants of resistances 28 and 29 and condenser 15, the device 21 is again ionized to break down the impedance of device 22 in turn. The operation is repeated as described above. Of course, after the first cycle of operation and as long as the switch 17 remains closed, the relays 13 and 18 do not further influence the functioning of the system. The devices 22 and 23 then continue to ionize alternately and to permit current to flow through them from the direct current source 12.

It may be observed that in the system shown in Fig. 3, the intervals between the ionization of the devices 22 and 23 differ. As a result, the closing times of circuit 26 and that of circuit 27 also differ. The time during which the circuit 27 is closed by armature and make contact 32 is dependent upon the time constants of condenser 15 and resistances 28 and 29, while the time during which circuit 26 is closed by armature and make contact 31 is determined by the time constant of condenser 15 and resistance 28 alone. This difference in time interval is advantageous in many systems. For example, for signaling purposes in telephone communication systems, it is desired to automatically maintain a ringing signal in telephone subscribers' sets for approximately two seconds, having a silence period of four seconds, resuming the ringing signal for two seconds and continuing this cycle of operation until the telephone subscriber answers the call. It has been found that if the resistance 28 is 5 megohms, resistance 29—5 megohms, condenser 15—1.12 microfarads, condenser 10—10 microfarads and the voltage of the generator 12—130 volts the circuit 26 is closed for approximately two seconds, while the circuit 27 is closed alternately for a period of four seconds. The signaling apparatus for ringing could then be connected to the circuit 26 to achieve the purpose desired in these telephone communication systems.

Figure 4:
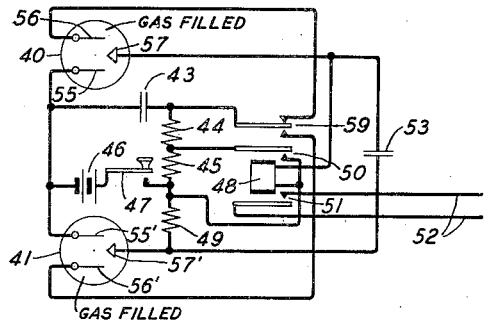
Fig. 4 shows schematically a modification of the interrupter circuit illustrated in Fig. 3.

Like the interrupter system illustrated in Fig. 3, the system shown schematically in Fig. 4 comprises two gaseous space discharge devices 40 and 41, known commercially as the cold cathode type, connected in push-pull relation. The device 40 comprises two cathodes 55 and 56 and an anode 57. The device 41 comprises two cathodes 55' and 56' and an anode 57'. One plate of a condenser 43 is connected to the cathodes 55 and 55' while the other plate of the condenser is connected to the anodes 57 and 57' through two resistances 44 and 45. A battery 46 or other source of unidirectional current furnishes current for charging the condenser through a manually operated switch 47 and resistance 44 or resistances 44 and 45 and anode potential for devices 40 and 41. An electromagnetic relay 48 is inserted in the output circuit of device 40, while a resistance 49 is serially connected in the output circuit of device 41. A pair of contacts and an armature 59 associated with the electromagnetic relay 48 connect the plate of the condenser connected to the resistances 44 and 45 to either the cathodes 56 or 56'. When the relay 48 is energized the condenser 43 is connected to the cathode 56' of device 41, while when the relay 48 is not energized, the condenser 43 is connected to the cathode 56 of the device 40. A make contact and armature 50 associated with the relay 48 effectively remove the resistance 45 from the charging circuit. Another make contact and armature 51 controls a circuit 52. A condenser 53 connected to the anodes 57 and 57' of devices 40 and 41 operates and functions in a manner similar to that of condenser 10 in Figs. 1 to 3.

The system shown in Fig. 4 is started by depressing the key 47 to complete the charging circuit for condenser 43 and connects the battery 46 to the anode-cathode circuits of devices 40 and 41. At that time, the relay 48 being deenergized, the condenser 43 charges through resistances 44 and 45. Further, the condenser is connected to the cathode 56 of device 40. When the condenser attains a potential above that at which the device 40 breaks down, the device 40 ionizes. The relay 48 is energized to switch the condenser from the cathode 56 of device 40 to the cathode 56' of device 41 to effectively remove the resistance 45 from the charging circuit and to close the circuit 52. The condenser 43 now commences to charge through resistance 44. When the condenser 43 attains a sufficient potential, the device 41 ionizes. For the reasons stated in the description of Figs. 2 and 3, the condenser 53, like the condenser 10 in Figs. 2 and 3, operates at this time to interrupt the current traversing device 40. No current flows in the output of device 40 and relay 48 is deenergized. The condenser 43 is switched from the cathode 56' of device 41 to the cathode 56 of device 40. Resistance 45 is inserted in the charging circuit and the current flowing through the circuit 52 is interrupted. This cycle of operation is repeated whereby the circuit 52 is closed and opened at predetermined intervals. The period during which the circuit 52 is closed is determined substantially by the time constants of resistance 44 and the capacity of condenser 43, while the period during which the circuit 52 is opened is determined by the time constants of condenser 43 and resistances 44 and 45. Accordingly, the lengthening or shortening of the period of closure of the circuit 52 may be controlled by increasing or decreasing the values of resistances 44 and 45.

While preferred embodiments of this invention have been illustrated and described, various modifications therein may be made without departing from the scope of the appended claims.

What is claimed is:

1. A system for converting direct current into alternating current comprising a plurality of gaseous space discharge devices connected in push-pull relation, means for impressing an operating potential successively to the anodes of said devices, and a circuit coupled to the input circuit of said devices comprising a capacitance, a source of direct current for charging said capacitance and a gaseous space discharge device for discharging said capacitance to break down successively said plurality of gaseous space discharge devices.

2. In combination, a pair of gaseous discharge devices, output circuits for said devices, means for applying a substantially constant direct current operating potential to the output circuit of one of said devices, means for applying an equal substantially constant direct current operating potential to the output circuit of the other of said devices a predetermined interval after the application of operating potential to said first output circuit, means for ionizing said devices alternately, and means responsive to the ionization of said other device for deionizing said first device.

3. A circuit interrupting system comprising two circuits, two space discharge devices having input and output circuits connected thereto, a third gaseous space discharge device in the input circuits of said devices, means including a capacitance and a resistance for rendering conductive at predetermined intervals said third device, means in said output circuits for rendering conductive said two devices alternately in response to the conductivity of said third device, a relay in the output circuit of each of said two devices and responsive to the conductivity of its associated device, and a circuit controlled by the actuation of each of said relays.

4. In combination, a pair of gaseous space discharge devices each having a cathode, an anode and a control electrode, an output circuit coupled to the anodes of said devices including means for impressing a direct current positive potential to said anodes with respect to the cathodes of said devices, a control circuit connected to the control electrodes of said devices and including means for applying a bias to said control electrodes sufficient to hold said devices non-conductive, and means for overcoming said bias intermittently to initiate ionization of said devices including an electric discharge device coupled to said control circuit, a condenser in parallel with said electric discharge device and means for charging said condenser.

5. An inverter system comprising a pair of gaseous space discharge devices connected in push-pull relation, each of said devices having a cathode, an anode and a control electrode, a source for applying a direct current positive potential between the cathode and anode of each of said devices, a condenser connected between the anodes of said devices, and means for applying a starting potential alternately to the control electrodes of said devices including a gaseous discharge device coupled to the control electrodes of said first devices and a condenser in parallel with said source and said last-mentioned device.

6. An inverter system comprising a pair of gaseous space discharge devices each having a cathode, an anode and a control electrode, an output circuit connected between the anodes of said devices, a control circuit connected between the control electrodes of said devices, a condenser connected between said anodes, means including a direct current source for impressing a potential between the cathode and anode of one of said devices, means including said source for impressing a potential between the cathode and anode of the other of said devices a predetermined interval after the impressing of said first potential, and means coupled to said control circuit for intermittently impressing a starting potential thereon including a condenser in circuit with said source and chargeable thereby and means for discharging said condenser at periodic intervals.

7. An inverter system comprising a pair of gaseous space discharge devices each having a cathode, an anode and a control electrode, control and output circuits for said devices, means including a direct current source for applying a potential, sufficient to sustain ionization of said devices, to the anodes of said devices, a condenser connected between said anodes, and means for impressing intermittently a potential upon said control circuit to initiate ionization of said devices alternately including a condenser coupled to said control circuit and in shunt with said source and a gaseous space discharge device for discharging said second condenser at periodic intervals.

8. In combination, an electric discharge device having a cathode, an anode and a control electrode, an output circuit connected between said anode and said cathode including a direct current source for applying an operating potential between said cathode and said anode, means for periodically decreasing said potential below a value sufficient to sustain ionization of said device including a condenser and a unidirectional conductive device connected between said cathode and said anode, a control circuit connected between said cathode and said control electrode, and means for intermittently impressing a starting potential upon said control circuit including a condenser coupled to said control circuit and directly in series with said source and adapted to be charged thereby and means for periodically discharging said second condenser.

FRANK E. BLOUNT.